United States Patent
Lee et al.

(10) Patent No.: US 10,761,258 B2
(45) Date of Patent: Sep. 1, 2020

(54) OPTICAL SHEET MODULE AND BACKLIGHT UNIT HAVING SAME

(71) Applicant: LMS Co., Ltd., Pyeongtaek-si, Gyeonggi-do (KR)

(72) Inventors: Jung Min Lee, Pyeongtaek-si (KR); Hye Ryong Kim, Osan-si (KR); Ki Wook Lee, Anyang-si (KR); Jee Hong Min, Seongnam-si (KR)

(73) Assignee: LMS Co., Ltd., Pyeongtaek-si, Gyeonggi-do (KR)

( * ) Notice: Subject to any disclaimer, the term of this patent is extended or adjusted under 35 U.S.C. 154(b) by 218 days.

(21) Appl. No.: 15/739,316

(22) PCT Filed: Jun. 17, 2016

(86) PCT No.: PCT/KR2016/006429
§ 371 (c)(1),
(2) Date: Dec. 22, 2017

(87) PCT Pub. No.: WO2016/208911
PCT Pub. Date: Dec. 29, 2016

(65) Prior Publication Data
US 2020/0041715 A1 Feb. 6, 2020

(30) Foreign Application Priority Data

Jun. 22, 2015 (KR) .................. 10-2015-0088295

(51) Int. Cl.
*F21V 8/00* (2006.01)
*G02F 1/13357* (2006.01)

(52) U.S. Cl.
CPC ......... *G02B 6/0053* (2013.01); *G02B 6/0055* (2013.01); *G02F 1/133606* (2013.01); *G02F 2001/133607* (2013.01)

(58) Field of Classification Search
CPC ............... G02B 6/0053; G02B 6/0055; G02F 1/133606; G02F 2001/133607
See application file for complete search history.

(56) References Cited

FOREIGN PATENT DOCUMENTS

| JP | 2010-177047 A | 8/2010 |
|---|---|---|
| KR | 100862667 B1 | 10/2008 |

(Continued)

OTHER PUBLICATIONS

International Search Report dated Oct. 17, 2016 issued in parent application PCT/KR2016/006429.

*Primary Examiner* — Mariceli Santiago
(74) *Attorney, Agent, or Firm* — Polsinelli PC (57) ABSTRACT

The present invention relates to an optical sheet module that is arranged on one side of a light source and that transfers light upwards. Provided is an optical sheet module comprising: a base film sheet which transmits light; a light entrance surface which is formed in a lower part of the base film, through which light emitted from the light source is transmitted and through which the light enters internally; a light reflection surface which is located in the direction opposite to the light entrance surface, and which reflects light that enters through the light entrance surface and transfers the same upwards; and a light collection part in which a light collector unit having a cross-sectional area that decreases towards a lower part thereof is arranged consecutively and repetitively along the direction in which light is emitted from the light source, wherein the light collection part has a cross-sectional trajectory according to a vertical direction of the light reflection surface being formed retracting in an internal direction with reference to a virtual straight line trajectory from the lowest part to the highest part.

8 Claims, 6 Drawing Sheets

(56) References Cited

FOREIGN PATENT DOCUMENTS

| KR | 10-2009-0010306 A | | 1/2009 |
|---|---|---|---|
| KR | 10-1191760 B1 | | 10/2012 |
| KR | 101449951 B1 | * | 10/2014 |
| KR | 10-2015-0051532 A | | 5/2015 |

* cited by examiner

OPTICAL SHEET MODULE AND BACKLIGHT UNIT HAVING SAME

CROSS-REFERENCE TO RELATED APPLICATIONS

The present application claims the benefit of Korean Patent Application No. 10-2015-0088295 filed on Jun. 22, 2015 and PCT Application No. PCT/KR2016/006429 filed on Jun. 17, 2016, which are hereby incorporated by reference in their entirety.

TECHNICAL FIELD

The present invention relates to an optical sheet module having a reverse prism shape and a backlight unit including the same, and more particularly, to an optical sheet module capable of improving a viewing angle of light collected by a plurality of light collector units having a multi-angle shape, and a backlight unit including the same.

BACKGROUND ART

Recently, the use of flat display panels has increased, a liquid crystal display (LCD) being a representative flat display panel.

Generally, unlike existing cathode ray tube (CRT) displays, such an LCD requires a backlight module for providing light uniformly to an entire screen.

In an existing backlight unit, a lamp (i.e. a linear light source) and a lamp reflection plate for reflecting light generated by the lamp are disposed on one side of a light guide plate for converting the light generated by the lamp into planar light, and a reflection sheet for preventing a leakage of light is disposed on a lower portion of the light guide plate.

A prism sheet having a plurality of linear prisms having a triangular shape protruding upward is disposed on the light guide plate to collect scattered light. Since linear prisms are disposed perpendicularly to each other, two prism sheets may collect light beams reflected in different directions.

However, since such an existing backlight requires two prism sheets, production costs may be increased, a number of processes may be increased, and there may be a limit in reducing the thickness of a backlight unit.

Figure 1:
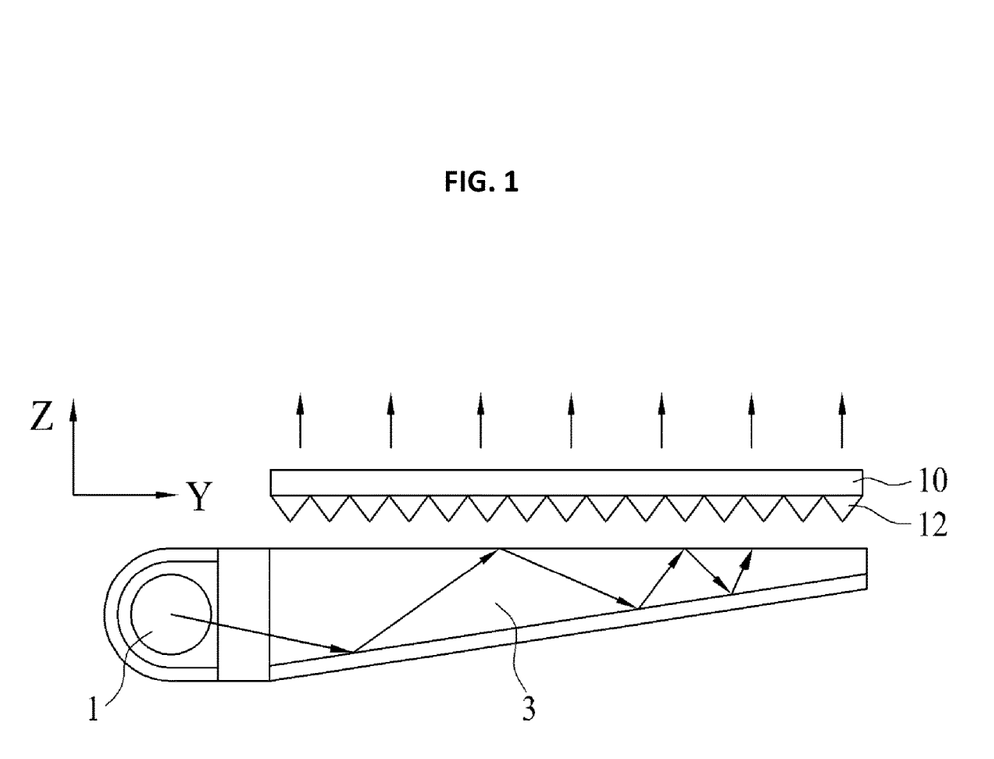
FIG. 1 is a view illustrating a backlight unit including an existing optical sheet module.

In order to overcome the limitations, recently, a prism sheet having a reverse prism shape, in which a prism peak 12 protrudes toward a light guide plate 3, i.e. in a downward direction, opposite to a direction disclosed in the related art, has been developed. Here, the prism peak 12 formed on the prism sheet 10 has a triangular shape, is repeated along the lower surface of the prism 10, and protrudes downwardly.

Figure 2:
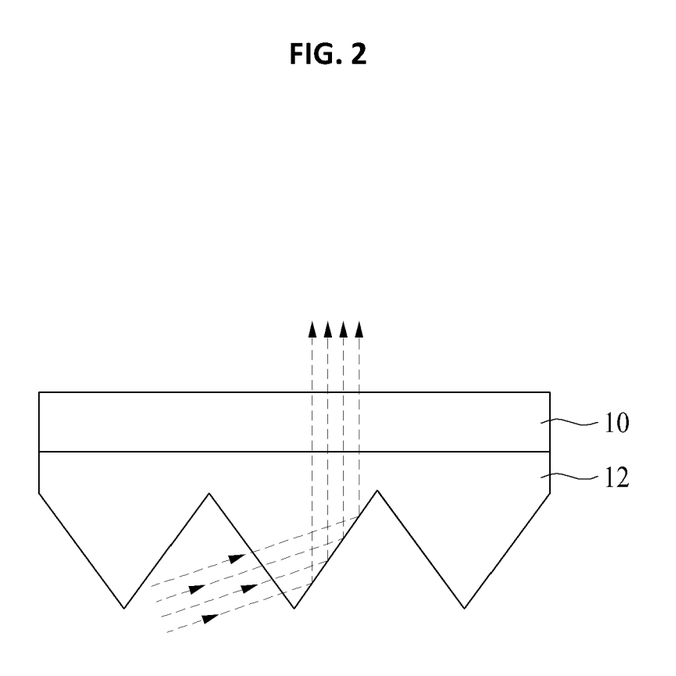
FIG. 2 is a view illustrating light refracted and transferred upwardly by the existing optical sheet module of FIG. 1.

Since light incident from the light guide plate 3 is totally reflected and transferred upwardly by an inner side surface of the prism peak 12, the prism sheet 10 having a reverse prism shape has advantages in terms of thickness and manufacturing costs, as compared to a case in which two prism sheets are used.

However, since incident light is collected in one direction when reflected by the prism peak 12, brightness is improved, but a viewing angle is narrowed when the prism sheet 10 having the reverse prism shape is used in a backlight unit of an LCD.

DISCLOSURE

Technical Problem

An aspect of the present invention provides an optical sheet module in which light collector units having a reverse prism shape are provided to collect light emitted from a light source upwardly and a portion of each of the light collector units is formed to have a multi-angle shape or a curved shape to collect light and improve a viewing angle of a liquid crystal display device, and a backlight unit including the same.

Technical Solution

According to an aspect of the present invention, there is provided an optical sheet module disposed on one side of a light source to transfer light upwardly, the optical sheet module including: a base film having a sheet shape and transmitting light; and a light collector part disposed on a lower portion of the base film and including light collector units each having a light entrance surface configured to transmit light emitted by the light source and allow the light to enter the light collector units and a light refracting surface configured to be disposed opposite to the light entrance surface and reflect the light incident through the light entrance surface to transfer the reflected light upwardly, wherein the light collector units each have a cross section gradually decreasing toward a lower portion thereof and are continuously and repeatedly arranged in a direction in which the light is emitted by the light source, wherein a vertical cross-sectional trajectory of the light refracting surface of the light collector part is inwardly indented with respect to a virtual straight line trajectory extending in a top-bottom direction.

The vertical cross-sectional trajectory of the light refracting surface may have a shape in which straight lines having different gradients are continuously connected.

The light refracting surface may have a first inclined surface having a lower tip contacting the light entrance surface and upwardly inclined at a first angle, and a second inclined surface extending upwardly from the first inclined surface and upwardly inclined at an angle narrower than the first angle, wherein portions of the light incident through the light entrance surface are reflected in different directions by the first inclined surface and the second inclined surface, respectively.

A length of a vertical cross-sectional trajectory of the first inclined surface may be different from that of the second inclined surface.

A transverse length of the light refracting surface may be longer than that of the light entrance surface.

The light entrance surface and the light refracting surface may contact each other at lower tips in a vertical direction thereof, and may be upwardly inclined from the lower tips so as to face each other.

According to another aspect of the present invention, there is provided a backlight unit including the optical sheet module.

Advantageous Effects

The present invention, for overcoming the aforementioned problems, has the following advantageous effects.

According to an aspect of the present invention, each of a plurality of light collector units, protruding from a lower surface of a base film to collect light, has a light entrance surface through which light is incident, and a light refracting surface configured to reflect the incident light upwardly, and the light refracting surface is formed in a multi-angle shape having different gradients to collect light transferred through a lower portion thereof, thereby improving a viewing angle of a liquid crystal display device.

The effects of the present invention are not limited to those described above and other effects, not stated herein, may be apparent to those skilled in the art from reference to the claims.

BEST MODE

Hereinafter, exemplary embodiments of the present invention by which an object of the present invention can be concretely realized will be described with reference to the accompanying drawings. In describing the present embodiment, varying configurations are described using the same terms and with the same reference numerals, and excessive descriptions thereof will be omitted.

Hereinafter, it is illustrated that an optical sheet module according to an embodiment of the present invention is applied to a backlight unit of a flat liquid crystal display device, such as an LCD or LED panel. However, the present invention is not limited thereto, and an optical sheet may be independently used. The backlight unit may be applied to apparatuses other than a liquid crystal display device, and may be applied to any device, as long as a device such as a lighting device changes characteristics and a path of light.

First, a schematic configuration of a backlight unit including an optical sheet module 400, according to an embodiment of the present invention, will be described with reference to FIGS. 3 to 6.

Figure 3:
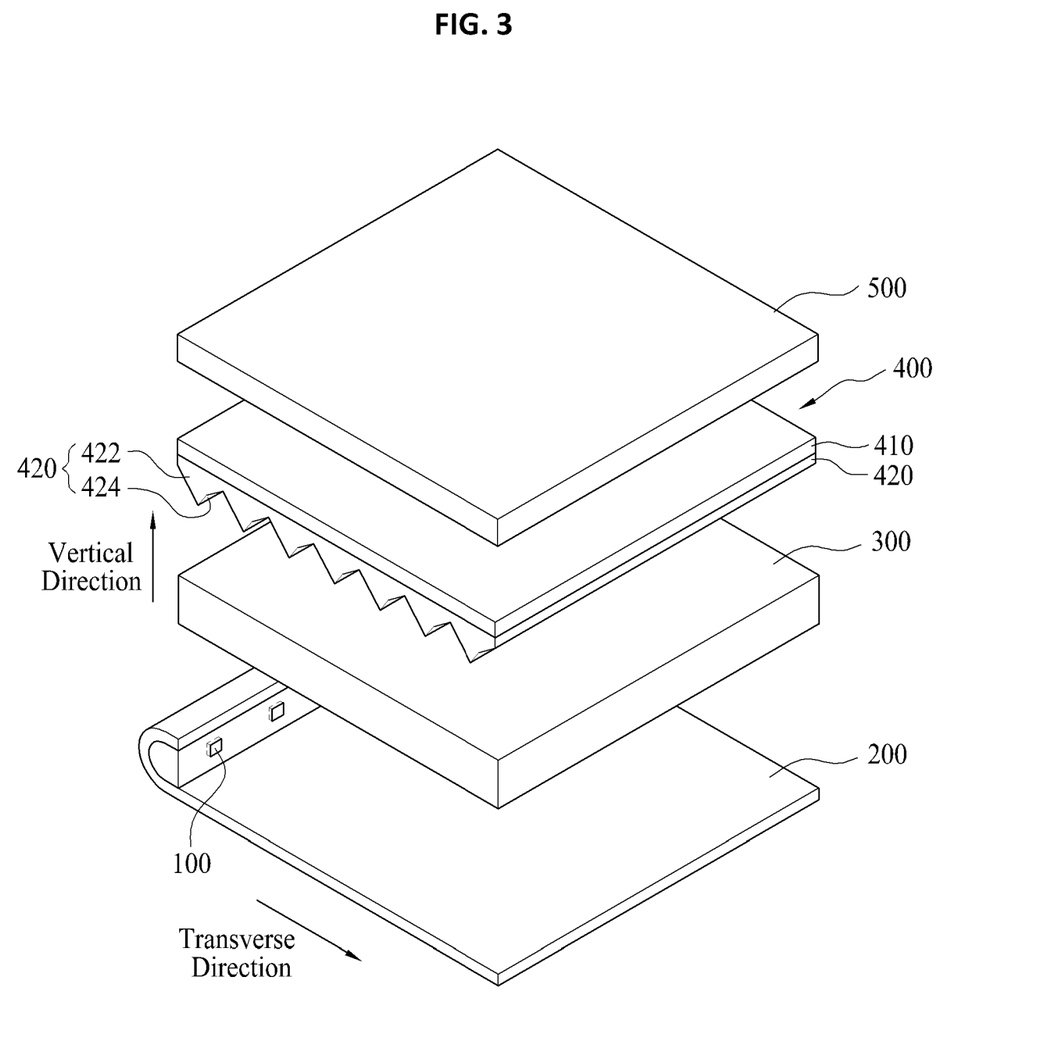
FIG. 3 is an exploded perspective view illustrating a configuration of a backlight unit including an optical sheet module according to an embodiment of the present invention.
Figure 4:
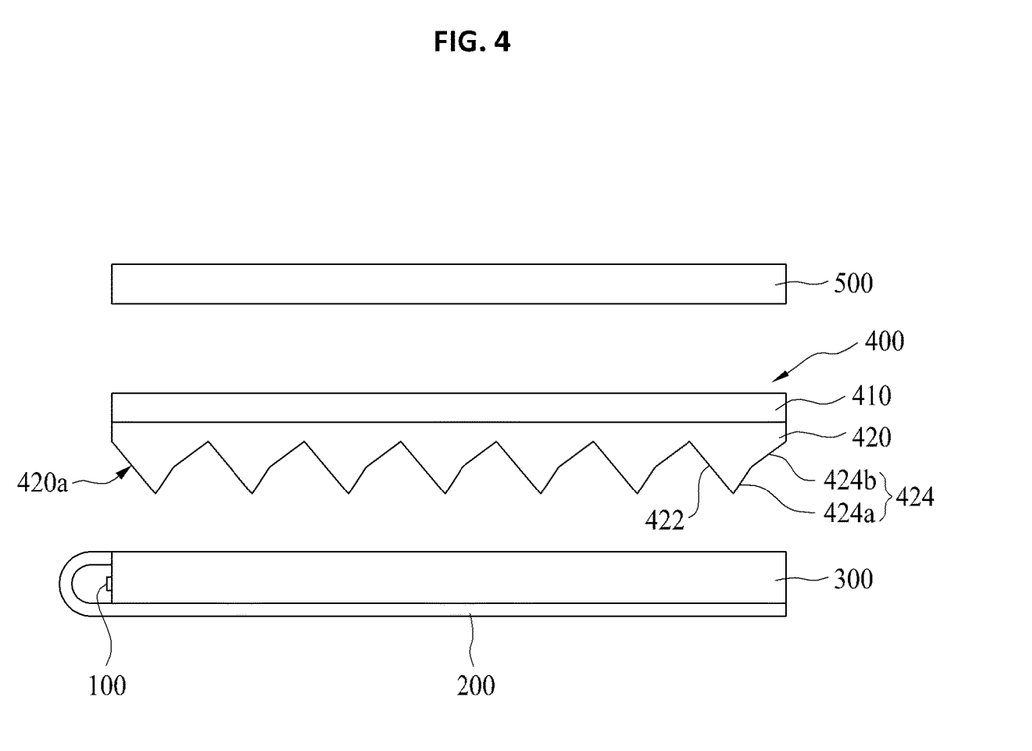
FIG. 4 is a lateral view illustrating the backlight unit of FIG. 3.

FIG. 3 is an exploded perspective view illustrating a configuration of the backlight unit including the optical sheet module 400 according to the embodiment of the present invention, and FIG. 4 is a lateral view illustrating the backlight unit of FIG. 3.

Figure 5:
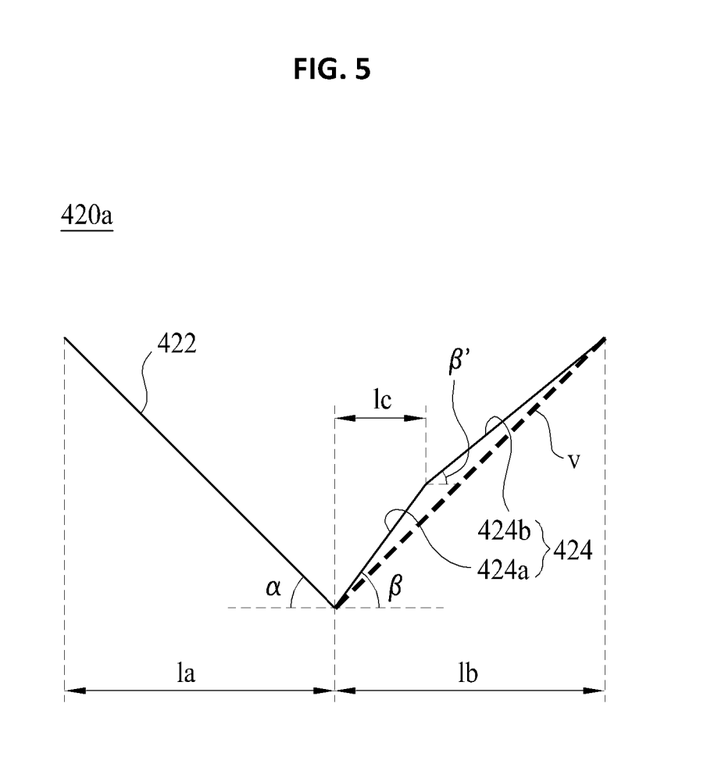
FIG. 5 is a view illustrating a specific configuration of the optical sheet module in the backlight unit of FIG. 3.
Figure 6:
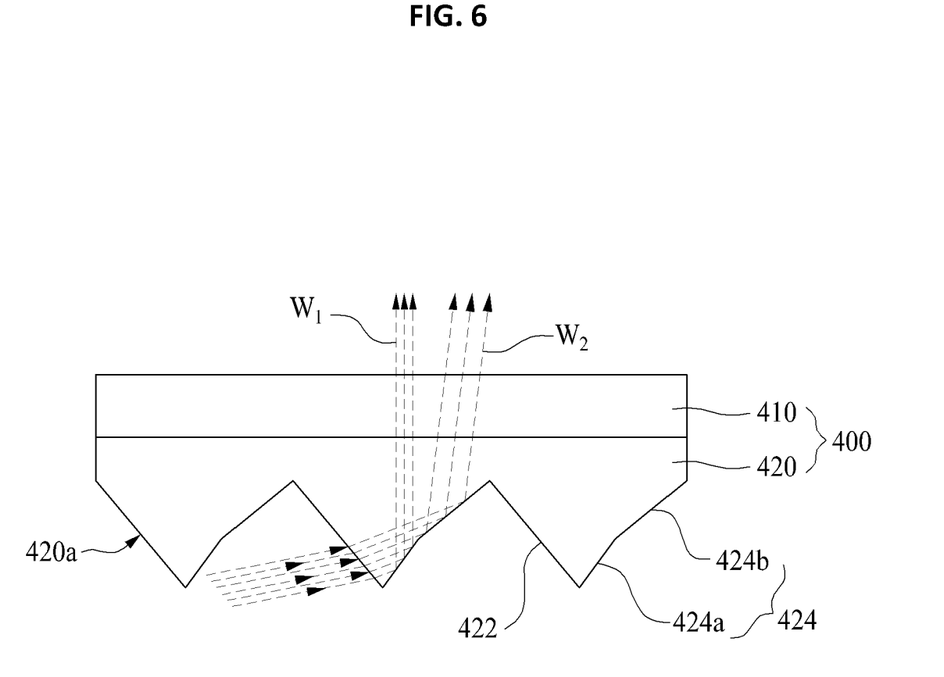
FIG. 6 is a view illustrating light refracted and transferred upwardly by the optical sheet module of FIG. 5.

FIG. 5 is a view illustrating a specific configuration of the optical sheet module 400 in the backlight unit of FIG. 3, while FIG. 6 is a view illustrating that light is refracted and transferred upwardly by the optical sheet module 400 of FIG. 5.

As illustrated, a liquid crystal display device should essentially include a backlight unit providing light to a liquid crystal panel. The backlight unit may include a light source 100, a reflection plate 200, a light guide plate 300, the optical sheet module 400, and a reflective polarization sheet 500.

The light source 100 generally includes an illuminant providing light. The light source 100 generates light on a side portion of the light guide plate 300 and transfers the generated light in the direction of the light guide plate 300.

The light guide plate 300 reflects and scatters the light generated by the light source 100 to transfer the scattered light in the direction of the optical sheet module 400.

Here, the reflection plate 200 is disposed on a lower portion of the light guide plate 300. Among the light generated by the light source 100, a portion traveling downwardly is reflected and transferred upwardly by the reflection plate 200.

The optical sheet module 400 is disposed on an upper portion of the light guide plate 300 and collects transferred light to transfer the collected light upwardly. Here, the optical sheet module 400 is formed in a reverse prism sheet shape and totally reflects the transferred light therein to refract the light upwardly.

Describing the optical sheet module 400 more specifically more specifically, the optical sheet module 400 mainly includes a base film 410 and a light collector part 420. The base film 410 is formed to have a flat film shape transmitting light.

Specifically, a light transmitting film easily transmitting light transferred through a lower portion thereof is generally used as the base film 410. The light collector part 420 refracting and collecting light is formed on a lower surface of the base film 410 to be integrated with the base film 410.

Here, the light collector part 420 is a pattern including a plurality of light collector units 420a for refracting light transferred through a lower portion thereof. In the present invention, the light collector units 420a have a cross section gradually decreasing toward a lower portion thereof and are continuously and repeatedly arranged along the lower surface of the base film 410. The light collector part 420 collects light transferred through the light guide plate 300 and transfers the collected light upwardly. Here, the base film 410 functions to simply transmit and transfer light upwardly.

Specifically, the light collector part 420 includes the plurality of light collector units 420a continuously formed on a lower portion of the base film 410. The light collector units 420a have a light entrance surface 422 facing the light source 100 and a light refracting surface (or a light scattering surface) 424 opposite to the light entrance surface 422.

The light entrance surface 422 is a surface through which the light generated by the light source 100 enters the light collector units 420a, and is formed to face the light source 100 in a transverse direction on the light collector units 420a.

As illustrated, the light collector units 420a are formed in a prism shape protruding downwardly from the base film 410. The light entrance surface 422 is inclined downwardly, together with the light refracting surface 424 to be described later, and a lower tip thereof contacts the light refracting surface 424.

In the present embodiment, as illustrated, the plurality of light collector units 420a of the light collector part 420 are arranged on the lower portion of the base film 410 and are continuously arranged away from the light source 100 in the transverse direction.

Here, the transverse direction is a direction along the lower surface of the base film 410, as illustrated in drawings, and a vertical direction refers to a direction in which the light collector part 420 is stacked on the light guide plate 300.

As described above, the light collector units 420a are formed such that the cross section thereof gradually decreases toward the lower portion thereof. The light entrance surface 422 is inclined and faces the light source 100.

Meanwhile, the light refracting surface 424 is disposed opposite to the light entrance surface 422 and totally reflects light incident through the entrance surface 422 to transfer the light upwardly.

Here, the light refracting surface 424 is inclined in the opposite direction to the light entrance surface 422, and the lower tip thereof contacts the light entrance surface 422.

As illustrated, a vertical cross-sectional trajectory of the light refracting surface 424 is inwardly indented with respect to a virtual straight line trajectory V extending in a top-bottom direction.

Specifically, the vertical cross-sectional trajectory of the light refracting surface 424 may be formed to have a shape in which straight lines having different gradients are consecutively connected to each other. The vertical cross-sectional trajectory of the light refracting surface 424 is configured to reflect light incident through the light entrance surface 422 upwardly.

Alternatively, the vertical cross-sectional trajectory of the light refracting surface 424 may be formed in an inwardly indented curve shape, rather than as a straight line.

In the present embodiment, as illustrated in FIG. 5, the light refracting surface 424 has a first inclined surface 424a and a second inclined surface 424b.

A lower tip of the first inclined surface 424a contacts the light entrance surface 444, and the first inclined surface 424a is upwardly inclined at a second angle β.

As illustrated in FIG. 6, the first inclined surface 424a is configured to reflect light incident through the light entrance surface 422 upwardly to transfer the reflected light upwardly in a first direction $W_1$.

Meanwhile, the second inclined surface 424b extends upwardly from the first inclined surface 424a and is upwardly inclined at a third angle β', narrower than the second angle β.

That is, the second inclined surface 424b extends upwardly from an upper tip of the first inclined surface 424a and forms the light refracting surface 424 together with the first inclined surface 424a.

Here, as illustrated, a virtual straight line trajectory of each of the first inclined surface 424a and the second inclined surface 424b is formed in a straight line. Alternatively, the virtual straight line trajectory may be formed as a curve.

The second inclined surface 424b, as formed above, is configured to reflect the light incident through the light entrance surface 422 upwardly to transfer the reflected light upwardly in a second direction $W_2$, different from the first direction $w_1$.

Here, as illustrated in FIG. 6, the second direction $W_2$ is a direction relatively biased to the right, compared to the first direction $W_1$. An angle of the second direction $W_2$ is adjusted with respect to the first direction $W_1$, according to an inclined angle of the second inclined surface 424b.

Therefore, the light collector units 420a according to the present invention have the light entrance surface 422 and the light refracting surface 424 and reflect the light incident through the light entrance surface 422 through the light refracting surface 424 to transfer the reflected light upwardly.

The light refracting surface 424 has the first inclined surface 424a and the second inclined surface 424b having different gradients and reflects portions of the light incident through the light entrance surface 422 in the first and second directions $W_1$ and $W_2$ to transfer the reflected portions of the light upwardly.

As described above, the light collector part 420 according to the present invention reflects portions of light transferred from the light guide plate 300 in the first and second directions $W_1$ and $W_2$ through the light refracting surface 424 formed on the light collector units 420a to transfer the reflected portions of the light upwardly.

Meanwhile, the reflective polarization sheet 500 according to the present invention is stacked on an upper portion of the optical sheet module 400 and transmits only a portion polarized in a specific direction among light transferred through a lower direction thereof to transfer the reflected portion upwardly.

Generally, the reflective polarization sheet 500 may be a stack including a plurality of layers and may operate as a reflective polarizer or a mirror, reflecting a specific polarized light. In addition, the reflective polarization sheet 500 may function as a wavelength-selective reflection mirror such as a "cold mirror" reflecting visible light and transmitting infrared light or a "hot mirror" transmitting visible light and reflecting infrared light.

As described above, the backlight unit according to the present invention includes the light source 100, the reflection plate 200, the light guide plate 300, the optical sheet module 400, and the reflective polarization module 500. Light generated by the light source 100 is collected and transferred upwardly by the optical sheet module 400.

In this case, the portions of the light transferred upwardly from the light guide plate 300 are respectively reflected and collected in the first and second directions $W_1$ and $W_2$ through the light refracting surface 424 formed on the light collector part 420 and are transferred upwardly.

Here, since the light transferred upwardly from the light collector part 420 is divided into the portions in the first and second directions $W_1$ and $W_2$, it is possible to improve a viewing angle of the backlight unit according to the present invention.

Next, a configuration of the light collector part 420 according to the present invention will be described in more detail with reference to FIGS. 5 and 6.

The light collector part 420 according to the present invention includes the plurality of light collector units 420a. Each of the light collector units 420a has the light entrance surface 422 facing the light source 100 and the light refracting surface 424 opposite to the light entrance surface 422.

The light entrance surface 422 and the light refracting surface 424 have the lower tips contacting each other, and are upwardly inclined.

As illustrated, the entrance surface 422 is inclined at a first angle α in the direction of the light source 100, and a portion of the light refracting surface 424 is inclined at the second angle β, i.e. inclined opposite to the light entrance surface 422.

Here, as described above, the light refracting surface 424 is formed to have a shape in which the first inclined surface 424a and the second inclined surface 424b are formed one after another. The lower tip of the first inclined surface 424a contacts the light entrance surface 422, and the first inclined surface 424a is upwardly inclined at the second angle β.

The second inclined surface 424b is inclined at the third angle β', successively to the first inclined surface 424a.

That is, the light entrance surface 422 is upwardly and uniformly inclined at the first angle α. The first inclined surface 424a of the light refracting surface 424 is inclined at the second angle β. The second inclined surface 424b is inclined at the third angle β'. The light refracting surface 424 forms the light collector part 420 together with the light entrance surface 422.

The light refracting surface 424 is formed as described above. A vertical cross-sectional trajectory continuously connecting the first inclined surface 424a and the second inclined surface 424b is inwardly indented with respect to the virtual cross-sectional trajectory V connecting a lower tip and an upper tip of the refracting surface 424 by a straight line.

Here, a length of a virtual straight line trajectory of the first inclined surface 424a may be different from that of the second inclined surface 424b.

A size of each of the first inclined surface 424a and the second inclined surface 424b may vary according to the length of the virtual straight line trajectory of each of the first inclined surface 424a and the second inclined surface 424b. Amounts of portions of light transferred in the first and second directions $W_1$ and $W_2$ are adjusted according to the sizes of the first inclined surface 424a and the second inclined surface 424b.

Therefore, when the backlight unit according to the present invention is used, it is possible to adjust a viewing angle and brightness of a liquid crystal display device.

In addition, a transverse length of the light refracting surface 424, in a direction in which light is emitted from the light source 100, may be longer than that of the light entrance surface 422.

Specifically, unlike the light entrance surface 422, the light refracting surface 424 is characterized in that the first inclined surface 424a and the second inclined surface 424b have different angles of inclination and are formed one after another. The amounts of the portions of the light transferred in the first and second directions $W_1$ and $W_2$ vary according to a transverse length ratio of the first inclined surface 424a to the second inclined surface 424b.

Here, since a transverse size of the light collector units 420a is constantly maintained, the transverse length of the light entrance surface 422 varies so as to correspond to a change in the transverse direction of the first inclined surface 424a and the second inclined surface 424b.

As illustrated, the transverse length of the light entrance surface 422 may be indicated as 1a, the transverse length of the light refracting surface 424 may be indicated as 1b, and the transverse length of the first inclined surface 424a may be indicated as 1c.

As described above, the lengths and the angles of inclination of the first inclined surface 424a and the second inclined surface 424b are adjusted according to lengths of 1a, 1b, and 1c to adjust brightness of portions of the light transferred in the first and second directions $W_1$ and $W_2$ or adjust an angle difference between the first direction $W_1$ and the second direction $W_2$.

As described above, in the light collector part 420, the light refracting surface 424 has the first inclined surface 424a and the second inclined surface 424b having different gradients, and the first inclined surface 424a and the second inclined surface 424b collect portions of the light in the first and second directions $W_1$ and $W_2$, respectively, thereby improving a viewing angle in a liquid crystal display device.

It will be apparent to those skilled in the art that various modifications and variations can be made in the present invention without departing from the spirit or scope of the inventions. Thus, it is intended that the present invention cover all possible modifications and variations of this invention provided they fall within the scope of the appended claims and their equivalents.

What is claimed is:

1. An optical sheet module disposed on one side of a light source to transfer light upwardly, the optical sheet module comprising:
    a base film having a sheet shape and transmitting light; and
    a light collector part disposed on a lower portion of the base film and comprising light collector units each having a light entrance surface configured to transmit light emitted by the light source and allow the light to enter the light collector units and a light refracting surface configured to be disposed opposite to the light entrance surface and reflect a light incident through the light entrance surface to transfer the reflected light upwardly, wherein the light collector units each have a cross section gradually decreasing toward a lower portion thereof and are continuously and repeatedly arranged in a direction in which the light is emitted by the light source,
    wherein a vertical cross-sectional trajectory of the light refracting surface of the light collector part is inwardly indented with respect to a virtual straight line trajectory extending in a top-bottom direction,
    wherein the light refracting surface has a first inclined surface having a lower tip contacting the light entrance surface and upwardly inclined at a first angle, and a second inclined surface extending upwardly from the first inclined surface and upwardly inclined at a second angle narrower than the first angle, and a cross-sectional trajectory along a vertical direction is formed to be recessed in an inner direction with respect to an imaginary linear trajectory,
    wherein portions of the light incident through the light entrance surface are reflected in different directions by the first inclined surface and the second inclined surface,
    wherein the light refracting surface has a length (lb) in a transverse direction with respect to a direction in which light is emitted from the light source is formed to be longer than a length (la) in the transverse direction of the light entrance surface,
    wherein a length along the transverse direction of the second inclined surface is adjusted by a third length along the transverse direction of the first inclined surface,
    wherein the second angle is an inclination angle of the first inclined surface, and the third angle is an inclined angle of the second inclined surface, and
    wherein the second angle and the third angle are adjusted according to a length (lc) along the transverse direction of the first inclined surface.

2. The optical sheet module of claim 1, wherein a length of a vertical cross-sectional trajectory of the first inclined surface is different from that of the second inclined surface.

3. The optical sheet module of claim 1, wherein a transverse length of the light refracting surface is longer than that of the light entrance surface.

4. The optical sheet module of claim 1, wherein the light entrance surface and the light refracting surface contact each other at lower tips in a vertical direction thereof, and are upwardly inclined from the lower tips so as to face each other.

5. A backlight unit comprising:
    a light source transferring light upwardly;
    a lamp reflection plate converting the light generated by the light source into planar light;
    a base film having a sheet shape and transmitting the planar light converted by the lamp reflection plate; and
    a light collector part disposed on a lower portion of the base film and comprising light collector units each having a light entrance surface configured to transmit light emitted by the light source and allow the light to enter the light collector units and a light refracting surface configured to be disposed opposite to the light entrance surface and reflect the light incident through the light entrance surface to transfer the reflected light upwardly, wherein the light collector units each have a cross section gradually decreasing toward a lower portion thereof and are continuously and repeatedly arranged in a direction in which the light is emitted by the light source, wherein a vertical cross-sectional trajectory of the light refracting surface of the light collector part is inwardly indented with respect to a virtual straight line trajectory extending in a top-bottom direction, wherein the light refracting surface has a first inclined surface having a lower tip contacting the light entrance surface and upwardly inclined at a first angle, and a second inclined surface extending upwardly from the first inclined surface and upwardly inclined at a second angle narrower than the first angle, and a cross-sectional trajectory along a vertical direction is formed to be recessed in an inner direction with respect to an imaginary linear trajectory, wherein portions of the light incident through the light entrance surface are reflected in different directions by the first inclined surface and the second inclined surface, wherein the light refracting surface has a length (lb) in a transverse direction with respect to a direction in which light is emitted from the light source is formed to be longer than a length (la) in the transverse direction of the light entrance surface, wherein a length along the transverse direction of the second inclined surface is adjusted by a third length along the transverse direction of the first inclined surface, wherein the second angle is an inclination angle of the first inclined surface, and the third angle is an inclined angle of the second inclined surface, and wherein the second angle and the third angle are adjusted according to a length (lc) along the transverse direction of the first inclined surface.

6. The optical sheet module of claim 5, wherein a length of a vertical cross-sectional trajectory of the first inclined surface is different from that of the second inclined surface.

7. The optical sheet module of claim 5, wherein a transverse length of the light refracting surface is longer than that of the light entrance surface.

8. The optical sheet module of claim 5, wherein the light entrance surface and the light refracting surface contact each other at lower tips in a vertical direction thereof, and are upwardly inclined from the lower tips so as to face each other.

* * * * *